Patented Mar. 2, 1954

2,671,030

UNITED STATES PATENT OFFICE 2,671,030

METHOD OF PREPARING HYDRAULIC CEMENT HAVING RETARDED SETTING ACTION

Johannes Göbel and Johan Gustaaf Stuve, Amsterdam, Netherlands, assignors to Shell Development Company, San Francisco, Calif., a corporation of Delaware No Drawing. Application January 6, 1949, Serial No. 69,604

2 Claims. (Cl. 106—94)

The present invention relates to a method of cementing wells by means of a cement composition having a retarded setting action.

It is sometimes desirable to retard the setting of a cement slurry. This is particularly true in the field of well drilling where it is common to cement the boreholes of oil or gas wells at depths greater than 10,000 feet. The greater the depth at which a cementation is to be carried out, the longer the time required to pump the cement to its proper location within the borehole. Also, high temperatures are often encountered in deep well boreholes which generally accelerate the setting action of cements.

Thus, when borehole cementations are carried out at a depth between 10,000 and 14,000 feet, borehole temperatures in the range of 150–170° C. may be expected and the time required for a cement slurry to be pumped to that depth may be in the vicinity of 120 minutes, said time also being dependent upon the quantity of cement to be pumped and the capacity of the pumps being used. It is therefore obvious that borehole cementations of deep wells must be carried out with a cement composition possessing slow setting characteristics whereby the cement may be pumped for extended periods of time at elevated temperatures without setting.

For purposes of comparison made hereinbelow it may be mentioned at this time that the temperature of a well at a 6000 foot depth is generally about 90° C. and also, that at a temperature of 150° C., cement sets from 2 to 4 times faster than at a temperature of 90° C.

While cements having a retarded setting action are particularly useful in cementing deep boreholes, it may sometimes be advantageous to use a slow set cement slurry in shallow wells or at shallower depths in the deep boreholes, for instance, when a cementation has to be carried out slowly or requires more than the normal time owing to technical conditions or operational difficulties.

When reference is made hereinbelow to the setting of the cement slurry, it is to be understood that this refers to the moment at which the so-called "initial setting" commences. When cement and water are mixed, the setting or stiffening of the mixture will at first be very gradual and later rapidly accelerate at a certain moment which is called "the moment of initial setting." This moment practically corresponds to the limit of pumpability, that is, that moment after which the cement cannot be pumped. The setting moment is determined with a Vicat apparatus.

It is an object of this invention to provide a method for cementing wells by means of a composition having a retarded setting action, said setting action being readily controllable by the addition of varying small quantities of a retarding agent to said cement.

It is also an object of this invention to effect the cementing of wells by means of a cement slurry composition incorporating a retarding agent, said composition exhibiting no tendency to foam and being substantially stable at all times, particularly under tropical conditions.

These and other objects of this invention will be understood from the following detailed description of the invention.

A product suitable for use in the process of the present invention comprises a finely ground mixture containing a suitable binding agent, preferably a Portland cement, together with a very small proportion of a natural resin such as shellac. Other inert material, such as sand, gravel, etc., may be added to the mixture. According to this invention, it is proposed to add a small quantity of shellac to a known hydraulic binding agent, such as cement, whereby a water slurry of said binding agent and shellac exhibits a retarded setting action. Preferably, the amount of shellac used may vary from ½ to 2½ per cent of the quantity of dry binding agent used.

In adding the shellac to a cement slurry, either of two methods may be employed. In the first method the shellac may be dissolved in an organic solvent which is then added to the dry cement, said solvent being allowed to evaporate before the cement is mixed with water. In the second method the shellac may be dissolved in a basic aqueous solution which is then added to the water with which the cement slurry is mixed. The invention is illustrated by the examples which follow:

EXAMPLE I

The shellac to be added to the cement according to the invention was dissolved in 60 cc. alcohol. This solution was then mixed with 375 g.

of dry cement, after which the solvent was evaporated with stirring, and the required quantity of water was added. The tests, the results of which are listed in Table I, were made with Enci Portland cement, Cemy blast furnace cement and Incor Portland cement. The quantity of shellac is stated as a percentage of the quantity of dry cement. In all the tests the ratio of water to cement was 0.4; the tests were carried out at a temperature of 90° C. The table gives the time in minutes until the moment of initial setting (limit of pumpability), and the maximum compression strength in kg./sq. cm. after the cement had hardened for 3 days.

*Table I*

| Percent Shellac | Enci Cement | | Cemy Cement | | Incor Cement | |
|---|---|---|---|---|---|---|
| | Min. | Kg./sq. cm. | Min. | Kg./sq. cm. | Min. | Kg./sq. cm. |
| 0.5 | 145 | 220 | 95 | 255 | 55 | 295 |
| 0.9 | 185 | 185 | 210 | 240 | 90 | 315 |
| 1.0 | 305 | | | | | |
| 1.2 | 480 | 165 | 480 | 195 | 265 | 270 |
| 1.4 | 900 | | | | | |

The results show that the retarding period is of the desired order of magnitude, i. e., 120 minutes or more, and gradually increases in proportion to the quantity of shellac added, the effect being adequate with all types of cement. Although the strength of the hardened cement usually tends to decrease as more shellac is added, it remains under all conditions well above the minimum value required for the desired application in drilling technique which may be taken to be approximately 100 kg. per sq. cm.

The shellac is believed to form a very thin coating about the grains of cement, which allows only a very slow water penetration. To obtain this coating about the grains, the shellac is preferably dissolved in a solvent, after which the solution is mixed with the dry or practically dry cement and the solvent is allowed to evaporate. In the course of evaporation care should be taken, as much as possible, to prevent the particles from sticking together (for example, by stirring) so that the coating formed about the grains is not damaged. The quantity of solvent to be used depends on the quantity of binding agent. When using alcohol and cement, good results were obtained with a ratio of 160 cc. of alcohol to 1000 g. of cement.

In addition to methyl- and ethyl-alcohol the following solvents may be used for shellac: higher alcohols, acetone and higher ketones, acetates, esters and similar substances, such as amyl alcohol, amyl acetate, benzol, chloroform, carbon tetrachloride, turpentine, glacial acetic acid and ether.

Further, it has been found that the shellac may also be added to the liquid with which the cement is mixed. Such a process is of great practical importance, since it eliminates the prior treatment of the cement.

Shellac is readily soluble in an aqueous solution with a hydroxyl ion concentration greater than approximately $10^{-4}$, for example, in aqueous solutions of ammonium hydroxide, morpholine, sodium hydroxide, potassium hydroxide, borax, ammonium carbonate, sodium silicate, sodium phosphate, sodium carbonate and potassium carbonate.

EXAMPLE II

For Cemy blast furnace cement and Enci Portland cement, the binding time in minutes until the moment of initial setting, and the compression strength in kg./sq. cm., were measured for various percentages of shellac. In these cases the shellac was dissolved in the mixing water, to which caustic soda had been added. The percentage of caustic soda, based on the quantity of cement, was also varied. The temperature at which the tests were carried out amounted to 90° C., the ratio of mixing water to cement being 0.4.

The results are listed in Tables II and III.

*Table II.—Setting times of cement slurry with shellac in minutes*

| | Percent Alkali | Percent Shellac | | | | | |
|---|---|---|---|---|---|---|---|
| | | 0 | 0.2 | 0.4 | 0.6 | 0.8 | 1.0 |
| Cemy Cement | 0.1 | 75 | 80 | 90 | 123 | 245 | 460 |
| | 0.2 | 75 | 80 | 70 | | 280 | 510 |
| | 0.3 | 70 | 70 | 65 | 90 | 235 | 480 |
| | 0.4 | 65 | 65 | 60 | 70 | 200 | 465 |
| | 0.6 | 60 | 65 | 60 | 60 | 100 | 360 |
| | 0.8 | 55 | 60 | 65 | 70 | 75 | 290 |
| | 1.0 | | | | | | 250 |
| Enci Cement | 0.2 | | | | | 105 | 390 |
| | 0.4 | | | | | | 330 |
| | 0.6 | | | | | 90 | 260 |
| | 0.8 | | | | | 60 | 220 |

*Table III.—Compression strength in kg./sq. cm. (1% shellac)*

| | Percent Alkali | Pressure Resistance in kg./sq. cm. measured after— | |
|---|---|---|---|
| | | 1 day | 3 days |
| Cemy Cement | 0 | 290 (without Shellac) | 290 (without Shellac). |
| | 0.2 | 250 | 200. |
| | 0.6 | 195 | 165. |
| | 1.0 | 175 | 155. |
| Enci Cement | 0 | 255 (without Shellac) | 330 (without Shellac). |
| | 0.2 | 175 | 160. |
| | 0.6 | 145 | 140. |
| | 1.0 | 120 | 115. |

From the above tables it appears that the moment of initial setting may be appreciably retarded without the pressure stability dropping below the aforementioned limit of 100 kg./sq. cm. Good results are obtained by adding approximately 1% shellac dissolved in 0.2% of caustic soda.

We claim as our invention:

1. A method of preparing a hydraulic cement composition comprising the steps of adding to a hydraulic cement small quantities of shellac dissolved in an organic solvent, said shellac being sufficient in amount to provide a retarded setting action to the cement, mixing said shellac and solvent with the cement, evaporating the solvent from the mixture and agitating the mixture during the evaporation stage to prevent the cement particles from sticking together.

2. A method of preparing a hydraulic cement composition having a retarded setting action for use in well cementing operations, said method comprising the steps of mixing the cement with a solution of shellac and alcohol, said shellac forming from 0.5 to 2.5% by weight of cement and being dissolved in alcohol in quantities of approximately 160 cc. of alcohol to 1000 grams of cement, evaporating the alcohol from the mixture and agitating the mixture during the evaporation stage to prevent the cement particles from sticking together.

JOHANNES GÖBEL.
JOHAN GUSTAAF STUVE.

References Cited in the file of this patent

UNITED STATES PATENTS

| Number | Name | Date |
|---|---|---|
| 212,686 | Greer et al. | Feb. 25, 1879 |
| 321,621 | Marsh et al. | July 7, 1885 |
| 362,851 | Mosher | May 10, 1887 |
| 2,221,175 | Bechtold | Nov. 12, 1940 |
| 2,427,683 | Ludwig | Sept. 23, 1947 |

FOREIGN PATENTS

| Number | Country | Date |
|---|---|---|
| 2,759 | Great Britain | of 1868 |
| 8,399 | Great Britain | of 1912 |
| 349,249 | Germany | of 1922 |